US010294974B2

(12) United States Patent
Gimenes et al.

(10) Patent No.: US 10,294,974 B2
(45) Date of Patent: May 21, 2019

(54) MODULAR SYSTEM

(71) Applicant: Amphenol Socapex, Thyez (FR)

(72) Inventors: Jean-Paul Gimenes, Scionzier (FR); Jean-Paul Barbosa, Passy (FR)

(73) Assignee: Amphenol Socapex, Thyez (FR)

( * ) Notice: Subject to any disclaimer, the term of this patent is extended or adjusted under 35 U.S.C. 154(b) by 533 days.

(21) Appl. No.: 15/041,831

(22) Filed: Feb. 11, 2016

(65) Prior Publication Data

US 2016/0238050 A1 Aug. 18, 2016

(30) Foreign Application Priority Data

Feb. 17, 2015 (FR) ..................................... 15 51333

(51) Int. Cl.

| | |
|---|---|
| ***F16L 3/00*** | (2006.01) |
| ***F16B 7/18*** | (2006.01) |
| ***F16L 3/10*** | (2006.01) |
| ***F16L 3/233*** | (2006.01) |
| ***H02G 3/32*** | (2006.01) |
| ***H01R 13/622*** | (2006.01) |

(Continued)

(52) U.S. Cl.

CPC ............ *F16B 7/187* (2013.01); *F16L 3/1041* (2013.01); *F16L 3/1058* (2013.01); *F16L 3/1075* (2013.01); *F16L 3/233* (2013.01); *H01R 13/622* (2013.01); *H02G 3/32* (2013.01); *H01R 13/5829* (2013.01); *H01R 13/6456* (2013.01); *H02G 3/22* (2013.01)

(58) Field of Classification Search

CPC ............ H01R 13/5829; H01R 13/6456; H01R 13/622; H01R 13/639; F16L 3/1041; F16L 3/105; F16L 3/1058; F16L 3/1075; F16L 3/233; Y10S 277/917; Y10T 24/1498; B65D 63/02; B65D 63/04; B65D 63/06; B65D 63/10; B65D 63/1027

USPC .......................................................... 439/321

See application file for complete search history.

(56) References Cited

U.S. PATENT DOCUMENTS 3,324,234 A * 6/1967 Hervig ..................... H01R 4/00 174/135
4,059,324 A * 11/1977 Snyder ................. H01R 13/623 439/321

(Continued)

FOREIGN PATENT DOCUMENTS

| | | |
|---|---|---|
| DE | 1650019 | 10/1967 |
| DE | 2646063 A1 | 4/1977 |
| JP | 10288722 A | * 10/1998 |

OTHER PUBLICATIONS

Search Report for FR1551333 dated Dec. 17, 2015; 2 pages.

*Primary Examiner* — Matthew R McMahon
(74) *Attorney, Agent, or Firm* — Blank Rome LLP

(57) ABSTRACT

The invention relates to the field of couplings, and more specifically to a system for assembling a modular coupling (100) comprising at least a main body (101), a thread (109) around a central axis (X) with restricted freedom to move relative to said main body (101) at least in a direction parallel to said central axis (X), and a distinct toothed part (113) that is fastened to the main body (101) and that presents a set of teeth with at least one front tooth (115) projecting along an axis parallel to said central axis (X). The system comprises a plurality of alternative toothed parts each presenting a different set of teeth for selection as a function of a set of front teeth of another coupling to which the modular coupling (100) is to be coupled.

9 Claims, 9 Drawing Sheets

(51) Int. Cl.

| | |
|---|---|
| *H01R 13/645* | (2006.01) |
| *H01R 13/58* | (2006.01) |
| *H02G 3/22* | (2006.01) |

(56) References Cited

U.S. PATENT DOCUMENTS

| | | | | | |
|---|---|---|---|---|---|
| 4,108,527 | A * | 8/1978 | Douty | H01R 13/5825 | 439/465 |
| 4,153,228 | A * | 5/1979 | Delserro | F16L 3/123 | 24/19 |
| 4,229,064 | A | 10/1980 | Vetter et al. | | |
| 4,406,041 | A * | 9/1983 | DeAnda | F16L 3/233 | 174/135 |
| 4,736,999 | A * | 4/1988 | Marks | H01R 13/6456 | 439/218 |
| 5,308,259 | A * | 5/1994 | Liao | H01R 13/6392 | 439/320 |
| 5,354,021 | A * | 10/1994 | Farrell | F16L 3/233 | 24/16 PB |
| 5,700,156 | A * | 12/1997 | Bussard | H01R 13/5804 | 439/471 |
| 5,993,266 | A | 11/1999 | Mayer et al. | | |
| 6,049,949 | A * | 4/2000 | Guthke | F16L 3/137 | 24/16 PB |
| 6,162,095 | A * | 12/2000 | Holman | H01R 9/038 | 439/607.59 |
| 6,370,810 | B1 * | 4/2002 | Widerman | A01K 97/10 | 24/16 PB |
| 6,478,609 | B1 * | 11/2002 | Davis | H01R 13/5812 | 439/465 |
| 6,666,726 | B2 * | 12/2003 | Koch | H01R 13/622 | 439/320 |
| 7,316,375 | B2 * | 1/2008 | Wakabayashi | B60R 16/0215 | 24/16 PB |
| 7,419,402 | B2 * | 9/2008 | Carnahan | H01R 13/5841 | 439/470 |
| 7,544,085 | B2 * | 6/2009 | Baldwin | H01R 13/5829 | 439/446 |
| 7,601,913 | B2 * | 10/2009 | Kim | F25D 23/064 | 174/481 |
| 7,736,196 | B1 * | 6/2010 | Isaac | H01R 13/64 | 439/247 |
| 7,837,495 | B2 * | 11/2010 | Baldwin | H01R 13/5804 | 439/446 |
| 7,955,126 | B2 * | 6/2011 | Bence | H01R 9/05 | 439/583 |
| 7,955,131 | B2 * | 6/2011 | Barbier | H01R 13/193 | 439/607.17 |
| 8,007,307 | B2 * | 8/2011 | Wang | H01R 13/506 | 439/367 |
| 8,025,536 | B1 * | 9/2011 | Kelly | H01R 13/6456 | 439/681 |
| 8,215,884 | B2 * | 7/2012 | Bulow | H01R 13/622 | 411/116 |
| 8,747,166 | B2 * | 6/2014 | Yamada | H01R 13/64 | 439/680 |
| 8,870,189 | B2 * | 10/2014 | Krausz | F16L 17/032 | 277/609 |
| 8,915,751 | B2 * | 12/2014 | Wood | H01R 9/0524 | 439/578 |
| 9,109,617 | B2 * | 8/2015 | Diep | F16L 3/1075 | |
| 9,209,580 | B2 * | 12/2015 | Rosenberger | H01R 13/622 | |
| 9,266,653 | B1 * | 2/2016 | Housser | B65D 63/00 | |
| 9,293,873 | B2 * | 3/2016 | Rosenberger | H01R 13/6456 | |
| 9,297,479 | B2 * | 3/2016 | Kato | F16L 3/2235 | |
| 2010/0236030 | A1 | 9/2010 | Dyer | | |
| 2012/0318935 | A1 * | 12/2012 | Benedetti | F16L 3/1075 | 248/74.1 |

* cited by examiner

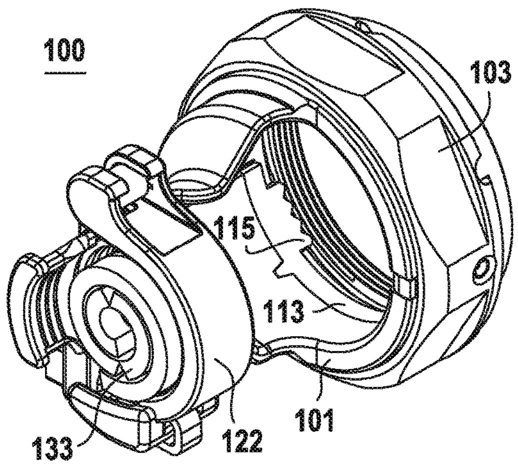
FIG.5A
FIG.5B
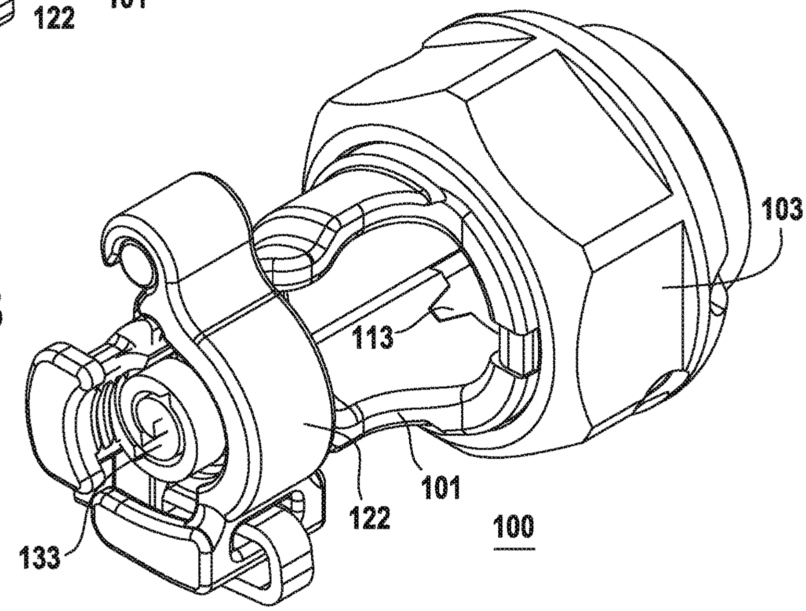
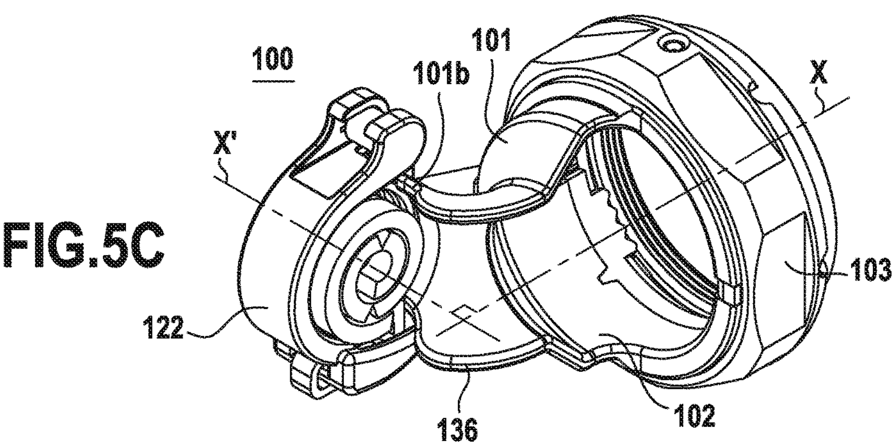
FIG.5C

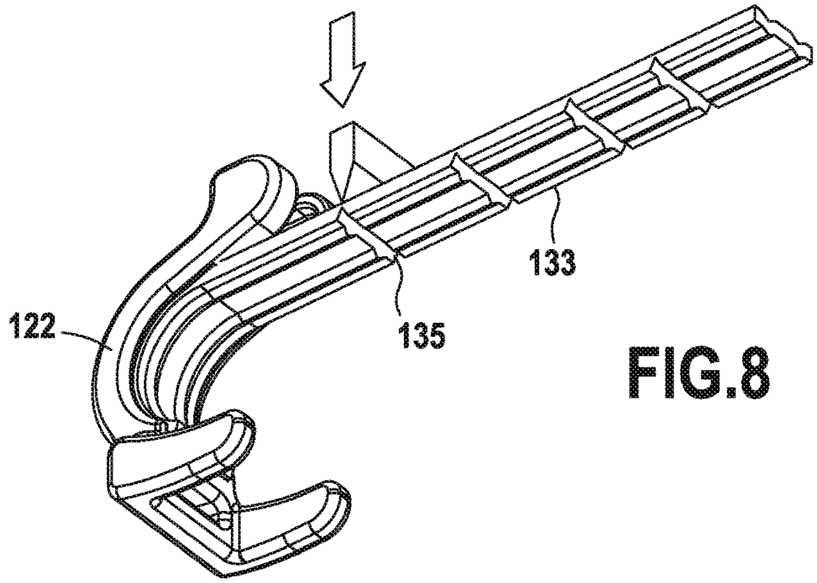
FIG.8
FIG.9
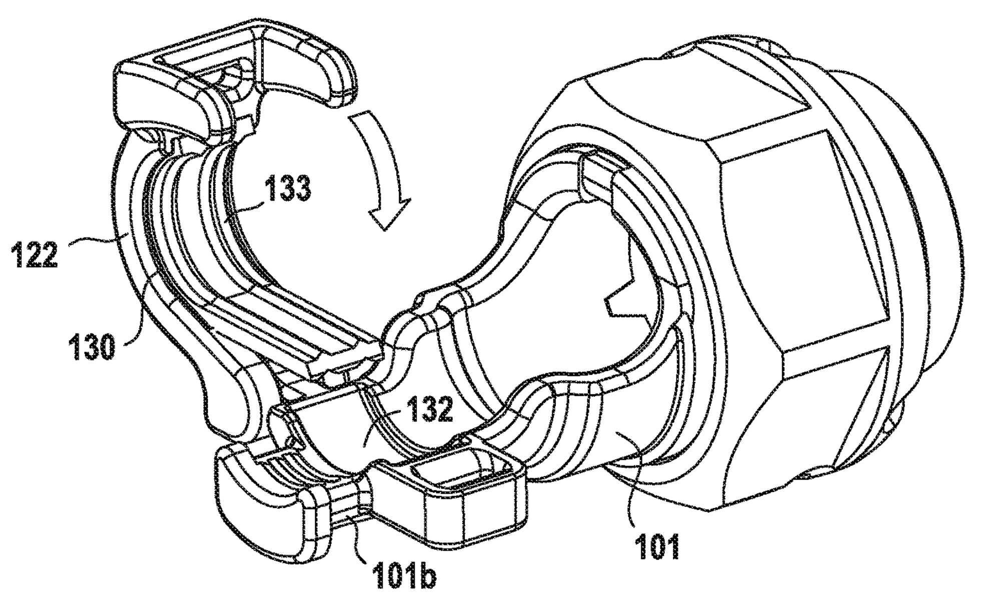

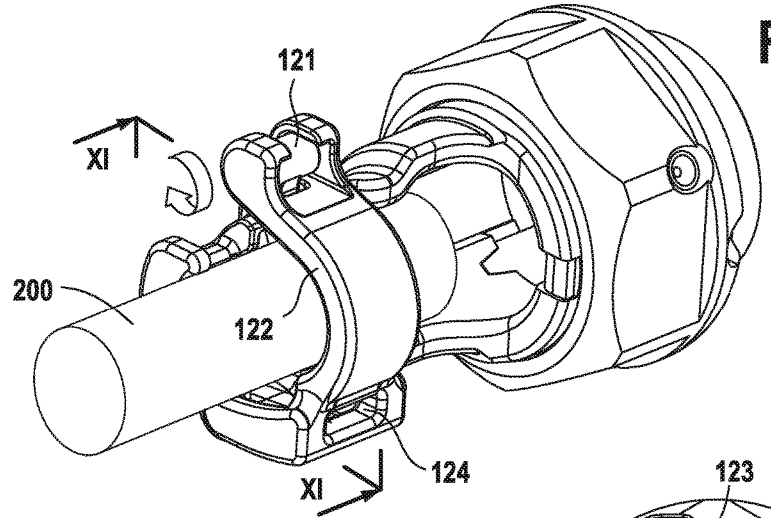
FIG.10
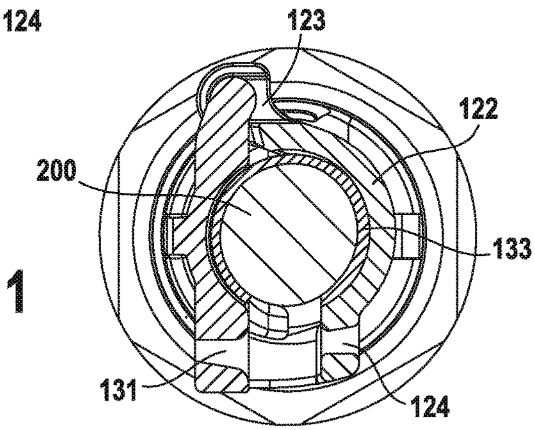
FIG.11
FIG.12
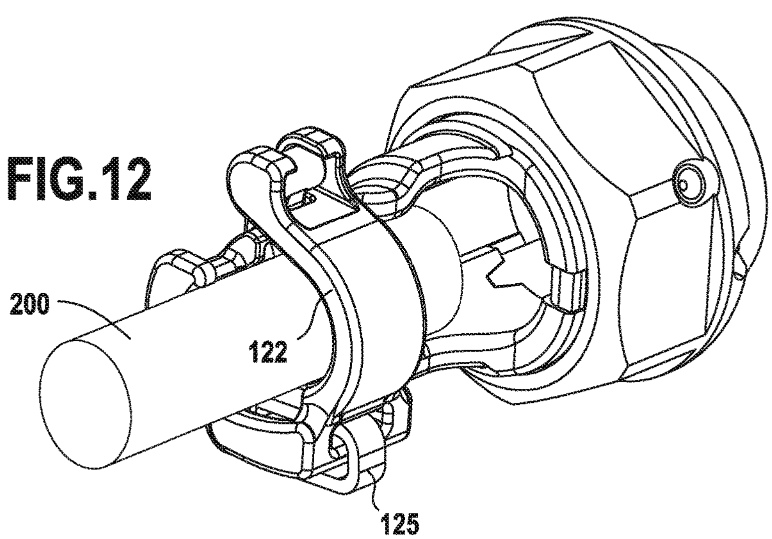

MODULAR SYSTEM

BACKGROUND OF THE INVENTION

The present invention relates to a system and a method of assembling a modular coupling. In this context, the term "coupling" is used to cover any part enabling two other elements to be coupled together, at least mechanically.

In particular in the field of aviation, but also in other technical fields, couplings are used to hold electrical connections and cables together mechanically, possibly while also providing electromagnetic protection around the connection and/or the cable. Such couplings include in particular couplings that have both a thread for co-operating with a complementary thread to provide axial fastening, and also front teeth for co-operating with complementary front teeth to prevent turning.

These couplings may comply with a multitude of different standards. By way of example, in the field of aviation, the following standards in particular are known: EN3660; EN3646; EN2997; EN3645; ABS2216; MIL-DTL-38999; MIL-DTL-83723; and MIL-DTL-85049. Each of those standards can present different parameters for coupling interfaces, and in particular different front teeth and different threads. That complicates inventory management, increases inventory costs, and can also lead to assembly errors due to confusion between couplings that are different and incompatible.

OBJECT AND SUMMARY OF THE INVENTION

The present disclosure seeks to remedy those drawbacks by proposing a more versatile system for assembling a modular coupling that can be adapted to a plurality of different standards.

In an embodiment, this object is achieved by the fact that the system comprises a main body, and a thread about a central axis with restricted freedom to move relative to said main body at least in a direction parallel to said central axis, and a plurality of alternative toothed parts suitable for being fastened to the main body and each presenting a different set of teeth with at least one front tooth projecting along an axis parallel to said central axis.

By having a plurality of alternative toothed parts available, each presenting a different set of teeth, it is possible to adapt a single main body of the modular coupling to a standard selected from a plurality of different standards merely by selecting a toothed part having the appropriate set of teeth for that standard, and fastening the toothed part to the main body. This makes it possible to simplify inventory management and to avoid errors in the use of couplings.

Each toothed part may in particular be in the form of a resilient split ring in order to make it easier to fit and fasten to the main body of the coupling. Nevertheless, it is possible to use other forms that are different, such as in particular a ring that is not split.

In order to make it easier to fasten the toothed parts, each may present at least one indexing tooth projecting in a direction opposite to said front tooth for the purpose of co-operating with a setback in the main body so as to block the toothed part against turning about the central axis relative to the main body. Furthermore, it may present at least one hook for retaining it axially relative to the main body. Nevertheless, as an alternative or in addition to the indexing finger and/or the hook, it is also possible to envisage using other means for fastening the toothed part to the main body, such as for example riveting, welding, adhesive, or crimping.

The system may in particular be adapted to assembling a coupling to be fastened on an outer thread. For that purpose, the system may include at least one coupling nut, said thread being an inner thread of said nut, and the nut being rotatable about the central axis and restricted in movement relative to the main body in a direction that is substantially parallel to the central axis. Furthermore, the system may not only be suitable for adapting to a plurality of different sets of front teeth, but it may also be suitable for being adapted to a plurality of different threads. For this purpose, the system may have a plurality of alternative coupling nuts, each presenting a different inner thread. Optionally, the system may also have a retention ring for retaining the nut axially relative to the main body. Thus, in order to assemble a coupling adapted to a certain thread, it is possible to select an appropriate nut and fasten it axially it to the main body.

The system may also comprise a clamping collar for fastening the modular coupling to a cable. Clamping collars are devices for providing a mechanical connection by peripheral compression obtained by elastic deformation. The collar may in particular comprise a pivot member having a first end suitable for being connected to the main body via a hinge engaging it to pivot relative to the main body, and a device for fastening a second end of the pivot member to the main body after the collar has been clamped. The collar may thus be clamped by pivoting the pivot member towards the main body so as to clamp the part for clamping between the pivot member and the main body.

Furthermore, in order to ensure that the coupling is held properly in position on the cable while making it easy to adapt the collar to a plurality of clamping diameters, the coupling may also comprise a strip, made of a more flexible material than the pivot member, the strip being secured to an inner surface of the pivot member over a length and presenting, between this length and an end of the strip, at least one mark corresponding to a predetermined clamping diameter. By means of these provisions, the flexible strip is secured to the remainder of the pivot member, thus reducing the number of different parts and simplifying parts management, while being easily adaptable to at least one predetermined clamping diameter, by cutting through its mark. Furthermore, in order to further increase the versatility of the collar, the strip may present a plurality of marks corresponding to a plurality of predetermined different clamping diameters.

Nevertheless, other alternative forms may also be envisaged: thus, by way of example, a collar with a flexible member could also be clamped around its central axis by bending the flexible member. Also alternatively, a member of the clamping collar could be connected to the main body in a manner other than by means of a hinge and it could move towards the main body in a manner other than by pivoting.

This disclosure also provides a method of mounting a modular coupling obtained from an above-mentioned system, wherein, prior to being fastened to the main body, a toothed part is selected among the plurality of alternative toothed parts presenting different sets of front teeth so as to be complementary to a set of front teeth of another coupling to which the modular coupling is to be connected. This mounting method may further include a step of selecting a coupling nut from a plurality of alternative nuts presenting different inner threads, so as to present an inner thread that is complementary to an outer thread of the other coupling, and a step of mounting the selected nut on the main body.

BRIEF DESCRIPTION OF THE DRAWINGS

The invention can be well understood and its advantages appear better on reading the following detailed description of several embodiments shown as non-limiting examples. The description refers to the accompanying drawings, in which:

FIGS. 5A to 5F are perspective views of modular couplings assembled from systems in alternative embodiments;

FIG. 8 shows a step of adapting the clamping collar of FIG. 1 to a determined clamping;

FIG. 9 shows a third step of assembling the FIG. 1 modular coupling;

FIG. 10 shows a first clamping step applied to the clamping collar;

FIG. 11 shows a second clamping step;

FIG. 12 shows a third clamping step;

DETAILED DESCRIPTION OF THE INVENTION

Figure 1:
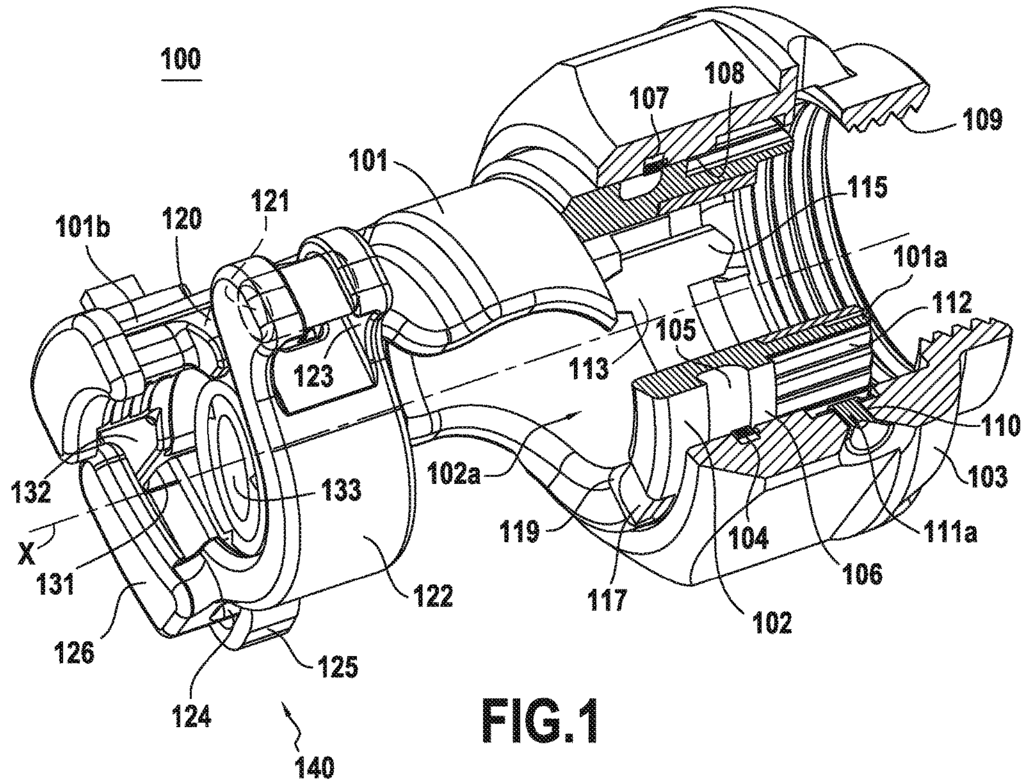
FIG. 1 is a perspective view of a modular coupling assembled from a system in a first embodiment.
Figure 16:
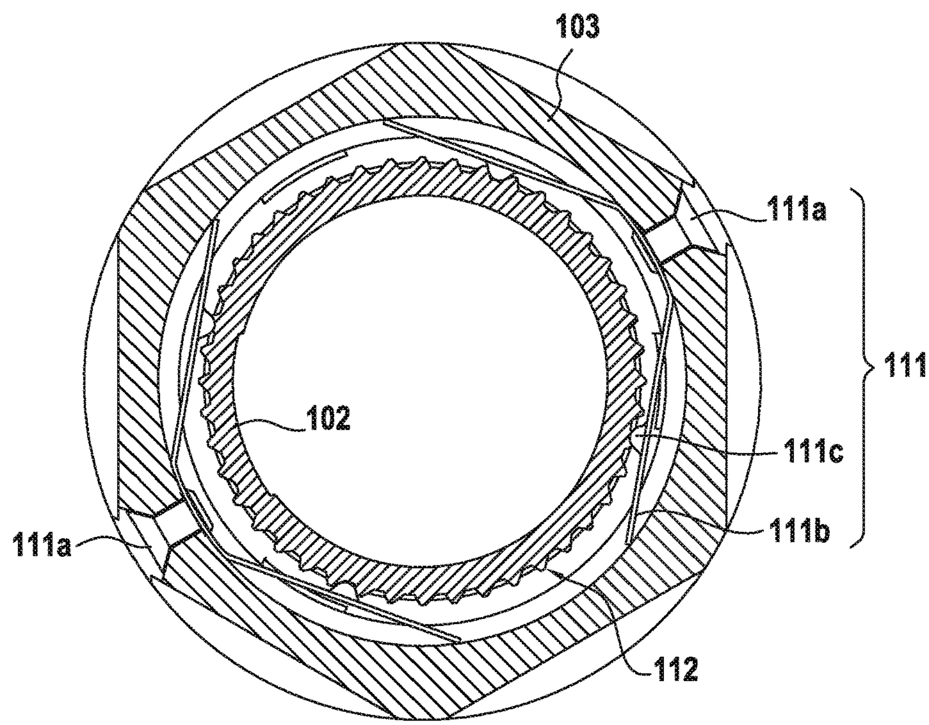
FIG. 16 is a cross-section of the FIG. 1 coupling.

FIG. 1 shows a modular coupling 100 comprising a main body 101 with a cuff 102 presenting a central passage 102*a*, a coupling nut 103 that can move axially relative to the main body 101 in a manner that is restricted by a resilient split ring 104 co-operating with an annular groove 105 in an outer surface 106 of the main body 101 and an annular groove 107 in an inner surface 108 of the nut 103. The nut 103 also presents an inner thread 109 on a segment that extends beyond a front end 101*a* of the main body 101, and two radial through orifices 110 having pawls 111 fastened thereto. As shown in FIG. 16, each pawl 111 comprises a fastener rivet 111*a*, a spring 111*b* and two projections 111*c*, one on each spring, these projections 111*c* engaging in longitudinal grooves 112 in the cuff 102 in order to oppose resistance to spontaneous turning of the nut 103 relative to the main body 101, e.g. due to vibration.

Figure 2:
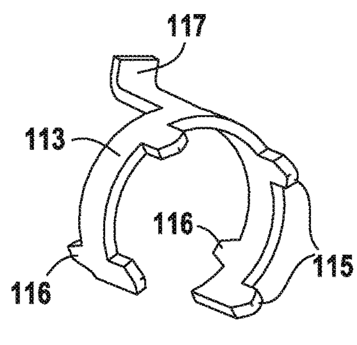
FIG. 2 is a perspective view of a toothed part of the FIG. 1 modular system.

The modular coupling 100 also includes a toothed part 113 mounted inside the cuff 102. This toothed part 113, which can also be seen in FIG. 2, is in the form of a resilient split ring so as to enable it to be inserted in the central passage 102*a* of the cuff 102, and it has a plurality of front teeth 115 projecting towards the front of the coupling 100 and distributed around a central axis X of the coupling 100. Furthermore, it also includes indexing fingers 116 projecting in the opposite direction, towards the rear of the coupling 100, and a hook 117 also projecting towards the rear, with a distal end that projects radially outwards.

Figure 3:
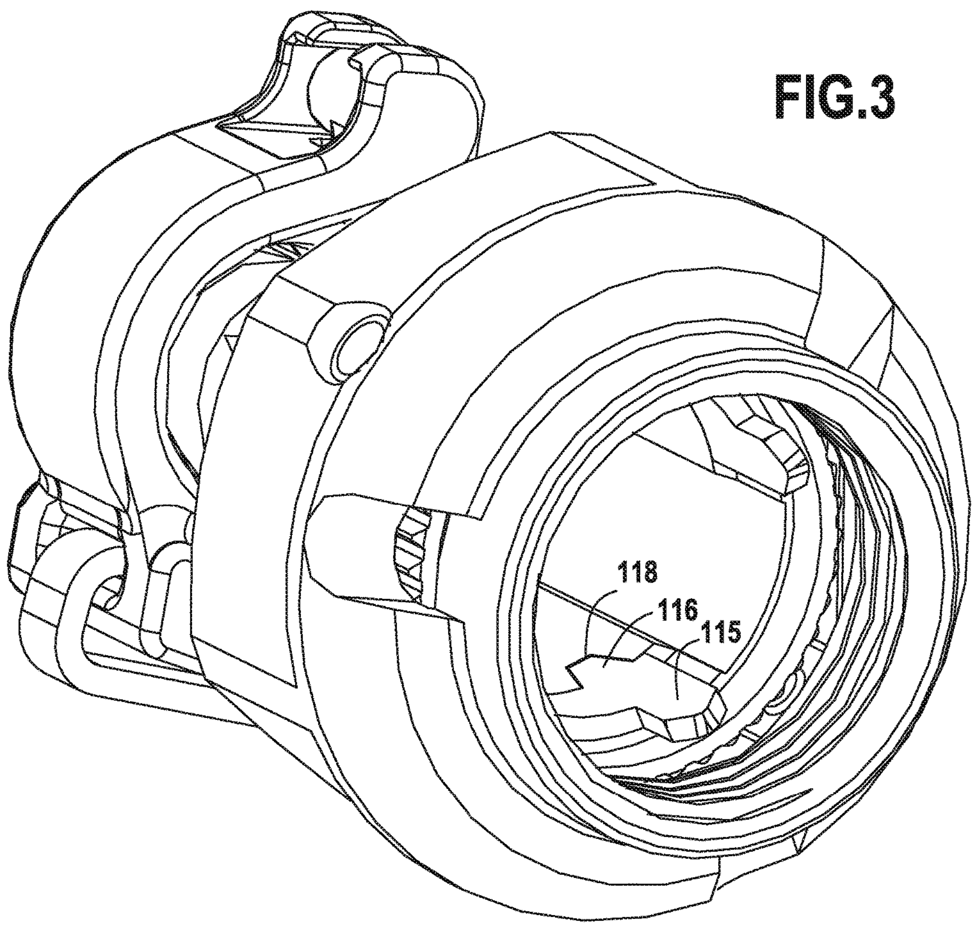
FIG. 3 is a detail view of the front of the FIG. 1 modular coupling.

As can be seen in FIG. 3, the indexing fingers 116 co-operate with complementary setbacks 118 in an inner surface of the central passage 102*a* of the cuff 102 in order to prevent the toothed part 113 from turning relative to the main body 101 about the central axis X. In addition, the distal end of the hook 117 penetrates into a notch 119 in the inner surface of the central passage 102 in order also to prevent the toothed part 113 from moving axially relative to the main body 101. The toothed part 113 as held in this way against the inner surface of the central passage 102*a* of the cuff 102 is thus held stationary relative thereto, possibly in releasable manner. The main body 101, the nut 103, the ring 104, the pawl 111, and the toothed part 113 may each be made of a suitable material, such as for example a polymer material or a metal.

The main body 101 extends rearwards beyond the cuff 102. An arm 120 extends laterally from a rear portion 101*b* of the main body 101, and pivots 121 extend in opposite directions, parallel to the central axis X, from a distal end of the arm 120. The modular coupling 100 also has a pivot member 122 that is mounted to pivot about an axis parallel to the central axis X relative to the pivots 121. The pivot member 122 may likewise be made of a material such as a polymer material or a metal, for example. In order to be mounted in pivotal manner relative to the main body 101, the pivot member 122 presents two half-open slideways 123 in a first end 122*a* that are arranged facing each other so as to be capable of receiving the pivots 121. Nevertheless, in an alternative, it is possible to envisage placing the pivots on the pivot member 122 and the slideways 123 in the rear portion 101*b* of the main body. Other hinges enabling the pivot member 122 to pivot in analogous manner relative to the rear portion 101*b* of the main body 101 and known to the person skilled in the art could also be considered. The pivot member 122 thus forms a first member of a clamping collar 140, and the rear portion 101*b* of the main body 101 forms a second member of the clamping collar 140.

The pivot member 122 presents an orifice 124 in a second end 122*b* opposite from the first end 122*a*, which orifice 124 serves to pass a self-locking tie 125, which may for example be a tie-wrap, together with two fingers 126 on respective sides of the orifice 124 and presenting two opposite surfaces 126*a* and 126*b* facing each other along an axis parallel to the central axis X. Between its first and second ends 122*a* and 122*b*, the pivot member 122 also presents a concave face 130 facing the rear portion 101*b* of the main body 101 and having another orifice 131 for passing the tie 125 and a likewise concave face 132 between the orifice 131 and the pivots 121, facing the pivot member 122. The tie 125 can thus block the pivot member 122 relative to the rear portion 101*b* of the main body 101. Nevertheless, other blocking devices could be envisaged as alternatives. Furthermore, in the embodiment shown, the orifice 131 is formed in a solid portion 132 of the main body 101 that is to be received between the surfaces 126*a* and 126*b* during pivoting of the pivot member 122 towards the concave face 132 of the main body 101, so as to transmit axial forces between the pivot member 122 and the main body 101.

Figure 4:
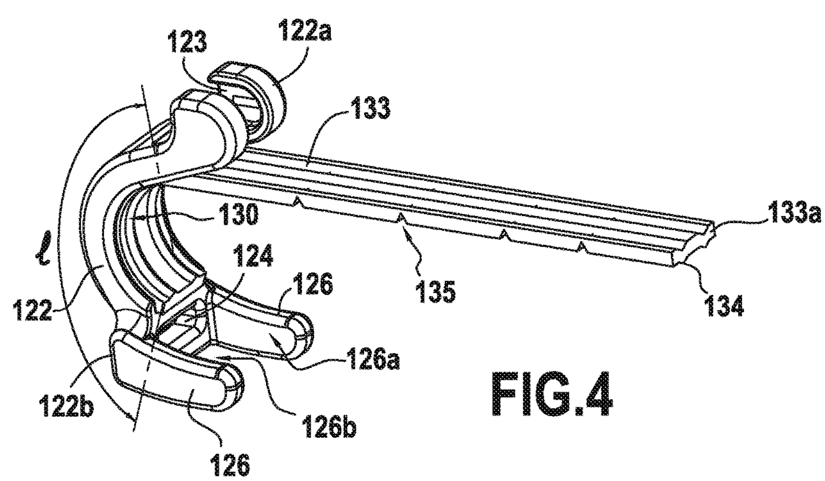
FIG. 4 is a perspective view of the pivot member of the FIG. 1 clamping collar.

As can be seen in particular in FIG. 4, a strip 133 made of a more flexible material than the pivot member 122 is overmolded over a certain length l on the concave face 130 of the pivot member 122, and it extends beyond this length l to an end 133*a*. This strip 133 presents two longitudinal V-shaped splines 134 that are thus oriented in a plane perpendicular to the central axis X, and also, between the length l overmolded on the concave face 130 of the pivot member 122 and the end 133_a_, marks 135 in the form of transverse notches that are thus oriented parallel to the central axis X and that are in positions that correspond to a plurality of predefined clamping diameters. The material of the strip 133 may be a polymer material, and in particular a polymer material comprising at least one polysiloxane. The pivot member 122 together with the rear end 101_b_ of the main body 101, the strip 133, and the self-locking tie 125, thus forms a clamping collar 140 around the central axis X of the coupling 100.

Figure 5D:
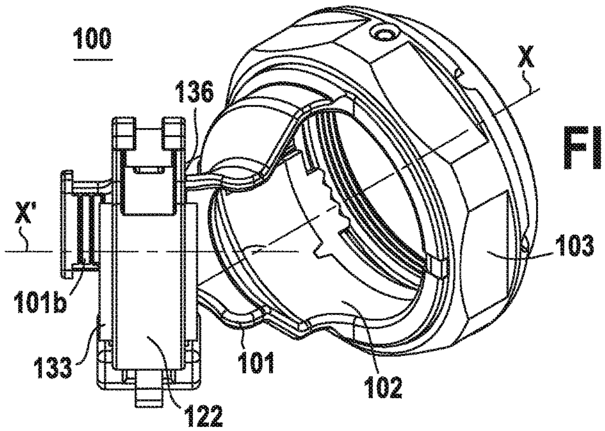
Figure 5E:
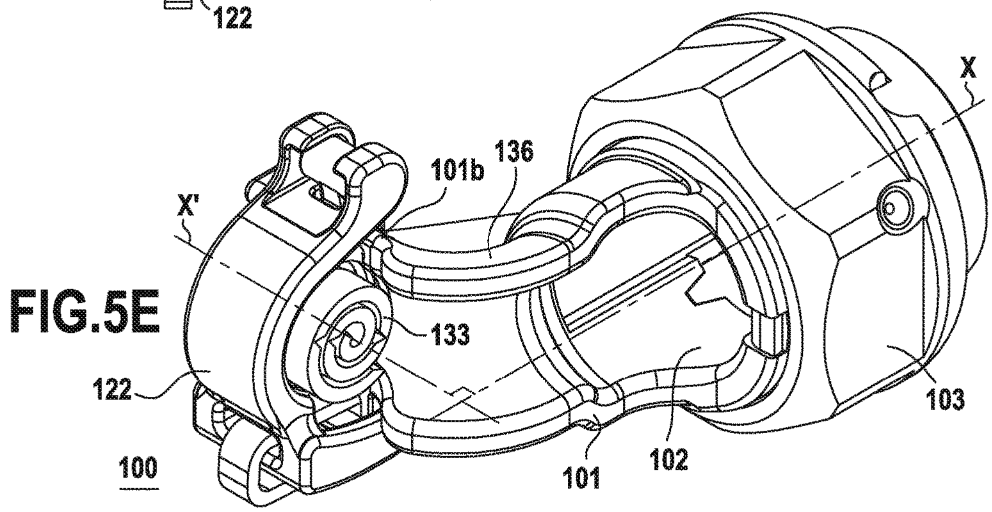
Figure 5F:
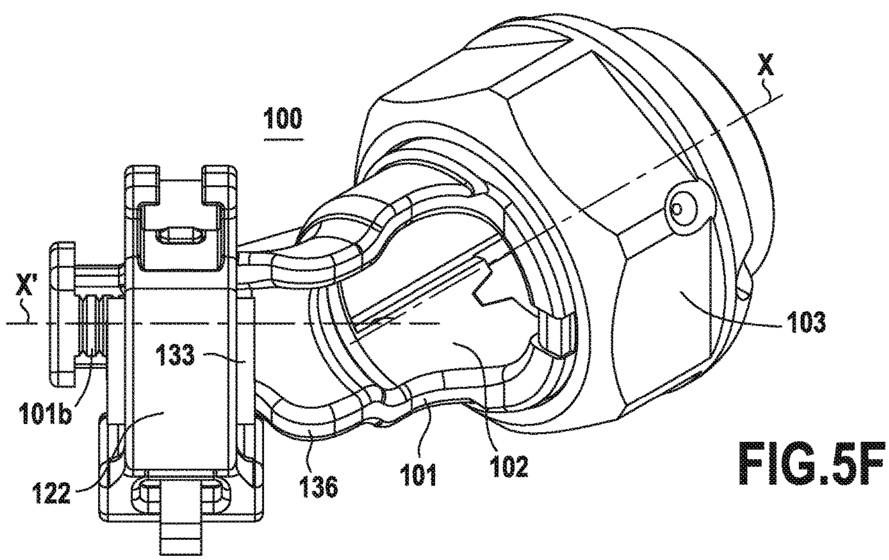
Figure 6:
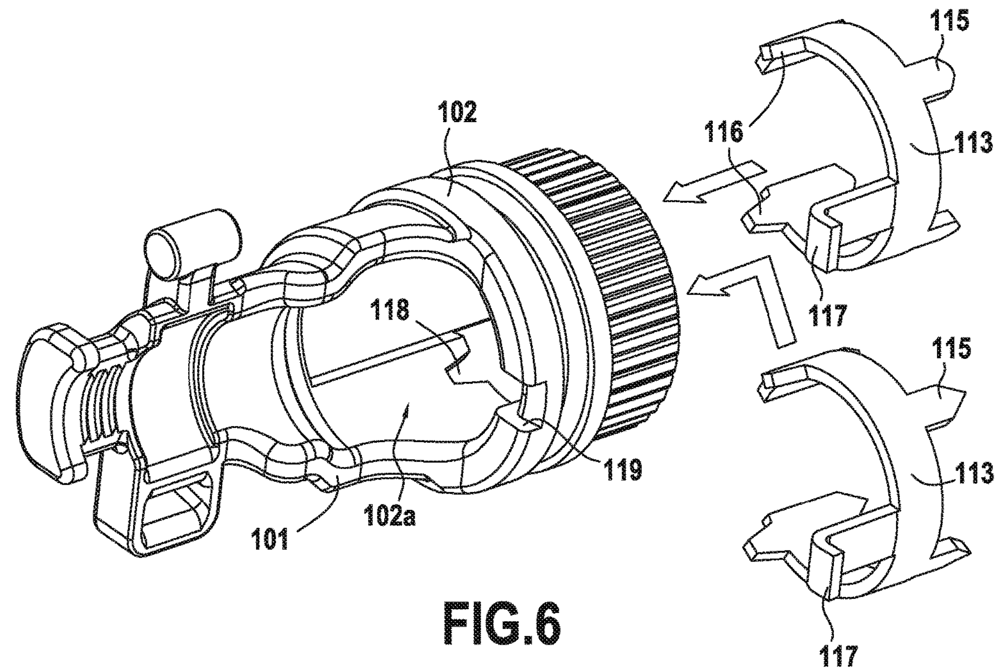
FIG. 6 shows a first step in assembling the FIG. 1 modular coupling.

As shown in the alternative embodiments shown in FIGS. 5A to 5F, where elements equivalent to those of the first embodiment are given the same references in the figures, the dimensions and the proportions of the elements of the coupling 100 may vary. Furthermore, the front teeth 115 on the toothed part 113 may be grouped in sets of pluralities of adjacent teeth 115, as can be seen in FIGS. 5A, 5C, and 5D. In addition, as can be seen in FIG. 5C to 5F, it is also possible to envisage that the clamping collar 140 is oriented relative to an axis X' different from the central axis X of the coupling 100 by having a bend 136 between the cuff 102 and the rear portion 101_b_ of the main body 101. In these embodiments, the pivot axis of the pivot member 122 and the marks 135 are parallel to the central axis X' of the clamping collar 140, and the longitudinal splines 134 are oriented in a plane perpendicular to the central axis X' of the clamping collar 140.

Assembling the modular coupling 100, fastening it to a cable 200, and coupling it with another coupling 300, are described below with reference to FIGS. 6 to 16. While the modular coupling 100 is being coupled to the other coupling 300, the front teeth 115 of the modular coupling 100 engage opposite front teeth 301 of the other coupling 300 in order to prevent them turning relative to one another, as shown in FIG. 15. Unfortunately, depending on the standard and the dimensions of the other coupling 300, the shape and the dimensions of its front teeth 301 may vary. For example, certain standards require triangular teeth having an angle α (ALPHA) of 90° between their flanks, as shown in FIG. 17A, while other standards require an angle α (ALPHA) of 100°, as shown in FIG. 17B.

Figure 17A:
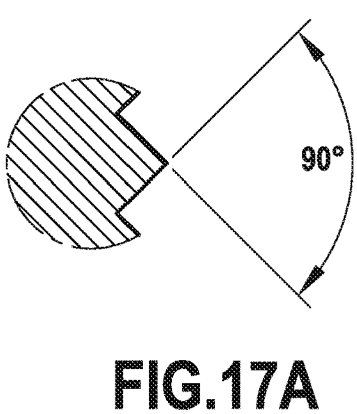
FIGS. 17A and 17B show two alternative front sets of teeth for a system in an embodiment of the invention.
Figure 17B:
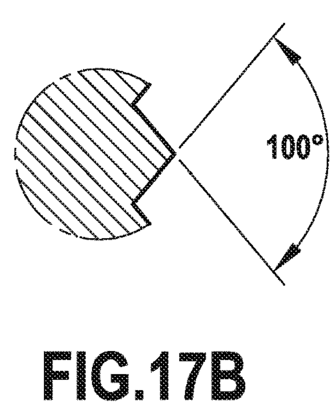

A system for assembling the coupling 100 may thus comprise, in additional to the main body 101, a plurality of alternative toothed parts that present different sets of teeth, as shown in FIGS. 17A and 17B. In a first step shown in FIG. 6, in order to adapt the coupling 100 to the front teeth 301 of the other coupling 300, a toothed part 113 is thus selected from among this plurality of alternative toothed parts presenting different front teeth so as to have front teeth 115 that are compatible with the front teeth 301 of the other coupling 300, and then the selected toothed part 113 is inserted into the central passage 102_a_ of the cuff 102 in order to fasten it against the inner surface of the central passage 102_a_ of the cuff 102, with its indexing fingers 116 in the complementary setbacks 118 and with the distal end of the hook 117 in the notch 119.

Figure 14:
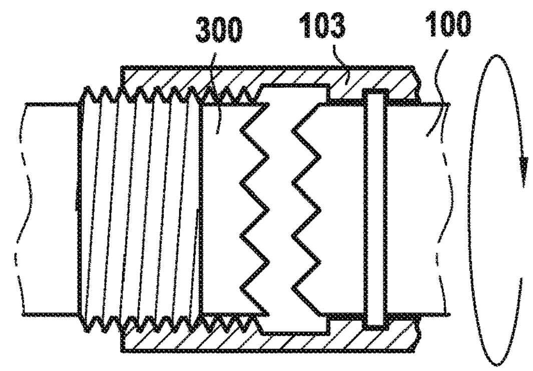
FIG. 14 shows a second coupling step.
Figure 15:
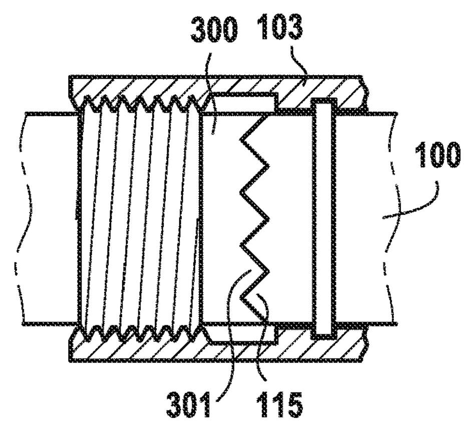
FIG. 15 shows a third coupling step.

While coupling the modular coupling 100 to the other coupling 300, the inner thread 109 of the nut 103 engages an outer thread 302 of the other coupling 300 in order to fasten the modular coupling 100 axially to the other coupling 300, as shown in FIG. 14. Unfortunately, depending on the standard and the dimensions of the other coupling 300, the shape and the dimensions of its outer thread 302 may also vary. For example, some couplings may present metric threads, while other couplings may present threads of pitch and dimensions that are not metric.

Figure 7:
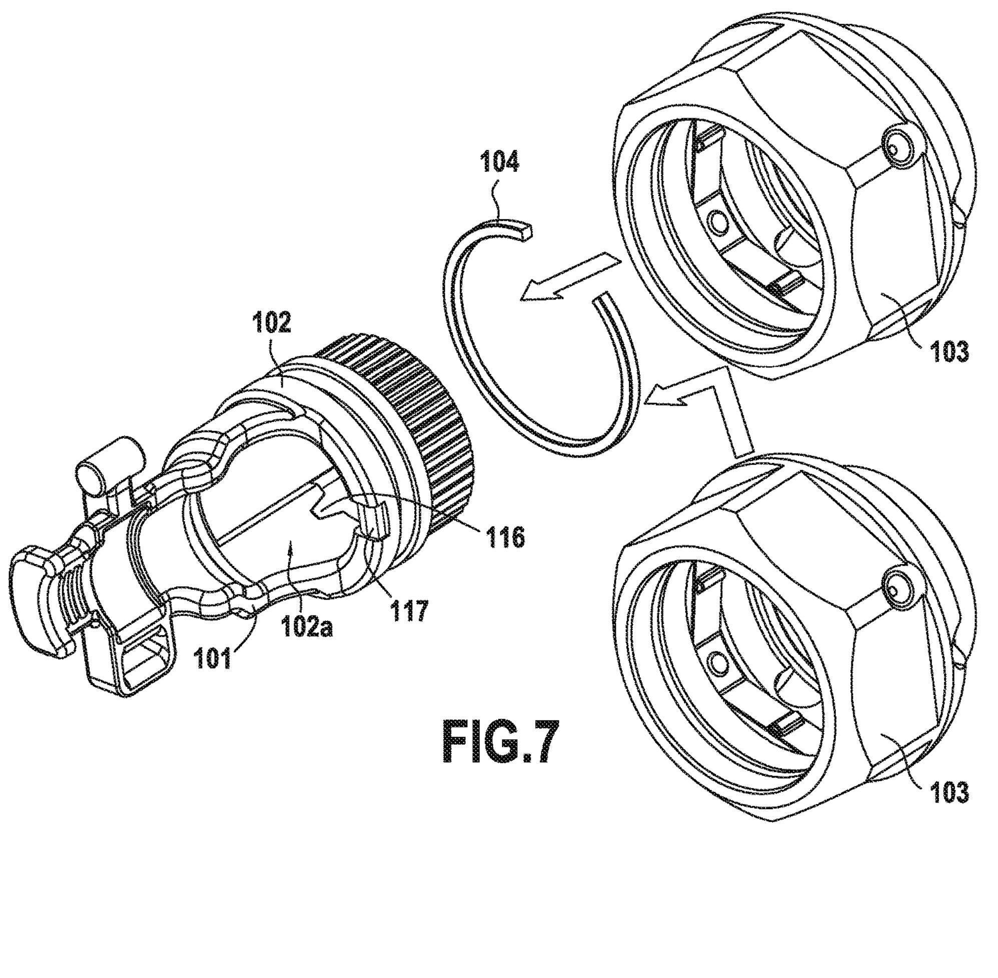
FIG. 7 shows a second step in assembling the FIG. 1 modular coupling.

Thus, the system for assembling the coupling 100 may also comprise a plurality of alternative nuts presenting different threads, and in a second step shown in FIG. 7, in order to adapt the coupling 100 to the outer thread 302 of the other coupling 300, a nut 103 is thus selected from a plurality of alternative nuts presenting different threads in order to have an inner thread 109 that is complementary to the outer thread 302 of the other coupling 303, and this nut 103 is mounted on the cuff 102 with its freedom to move axially being restrained using the resilient split ring 104.

While fastening the coupling 100 on the cable 200, the flexible strip 133 surrounds the outside of the cable 200, fitting closely thereto so as to ensure that the cable 200 is held properly in position in the collar 135. In order to ensure that the cable 200 is accurately centered in the collar 135, the length of the strip 133 may be adapted to the clamping diameter of the cable 200 by cutting the strip 133 at a corresponding one of the marks from among the marks 135, as shown in FIG. 8.

The pivot member 122 may be mounted on the rear portion 101_b_ of the main body 101 before or after cutting the flexible strip 133 at one of the marks 135, by inserting the pivots 121 in the slideways 123 in order to finish off assembling the coupling 100, as shown in FIG. 9.

Thereafter, in order to fasten the coupling 100 on the cable 200, the pivot member 122 is pivoted about the axis of the pivot 121 towards the concave face 132 of the rear portion 101_b_ of the main body 101 of the coupling 100, as shown in FIG. 10, so as to clamp the cable 200 between the concave faces 130 and 132, the flexible strip 133 fitting closely to the transverse outline of the cable 200, the strip being interposed between this outline and each of the concave faces 130 and 132, as shown in FIG. 11. Thereafter, a self-locking tie 125 is inserted through the orifices 124 and 131 and is blocked so as to keep the cable 200 clamped in the clamping collar 140, as shown in FIG. 12.

Figure 13:
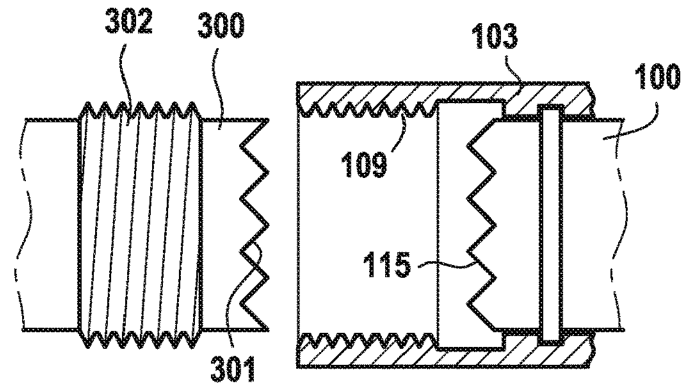
FIG. 13 shows a first coupling step applied to coupling the FIG. 1 modular coupling to a complementary coupling.

Thereafter, in order to couple the modular coupling 100 to the other coupling 300, the two couplings 100 and 300 are initially placed facing each other, as shown in FIG. 13, and then the inner thread 109 of the nut 103 is engaged on the outer thread 302 of the other coupling 300, and the nut 103 is turned, as shown in FIG. 14 until the front teeth 115 of the modular coupling 100 come into abutment against the opposite front teeth 301 of the other coupling 300, as shown in FIG. 15, thereby fastening the two couplings 100 and 300 relative to each other both axially and in rotation. Finally, as shown in FIG. 16, the pawl 111 ensures that the nut 103 is held in its angular position relative to the longitudinal grooves 112.

Naturally, couplings of the alternative embodiments shown in FIGS. 5A to 5F can be assembled, fastened, and coupled in analogous manner.

Although the present invention is described with reference to specific embodiments, it is clear that various modifications and changes may be made to those embodiments without going beyond the general ambit of the invention as defined by the claims. In addition, the individual characteristics of the various embodiments described may be combined in additional embodiments. Furthermore, an analogous clamping collar may be used independently of such a coupling, and the modularity of the coupling does not require using such a clamping collar. Consequently, the description and the drawings should be considered in a sense that is illustrative, rather than restrictive.

The invention claimed is:

1. A system for assembling a modular coupling comprising:

a main body;

a thread about a central axis with restricted freedom to move relative to said main body at least in a direction parallel to said central axis;

a plurality of alternative toothed parts suitable for being fastened to the main body and each presenting a different set of teeth with at least one front tooth projecting along an axis parallel to said central axis;

a clamping collar for fastening the modular coupling to a cable, wherein the clamping collar comprises a pivot member with a first end connected to the main body via a hinge engaging it to pivot relative to the main body, and a device for fastening a second end of the pivot member to the main body after the collar has been clamped; and a strip, made of a more flexible material than the pivot member, the strip being secured to an inner surface of the pivot member over a length, so as to be radially interposed between the cable and the inner surface of the pivot member after the collar has been clamped, and presenting, between this length and an end of the strip, at least one mark corresponding to a predetermined clamping diameter, the at least one mark comprising a transverse notch formed in the strip, wherein the strip is configured to be cut at the at least one mark corresponding to the predetermined clamping diameter.

2. The system according to claim 1, wherein each toothed part is a resilient split ring.

3. The system according to claim 2, wherein each toothed part presents at least one indexing tooth projecting in a direction opposite to said at least one front tooth for the purpose of co-operating with a setback in the main body so as to block the toothed part against turning about the central axis relative to the main body.

4. The system according to claim 2, wherein each toothed part presents at least one hook for retaining it axially relative to the main body.

5. The system according to claim 1, including at least one coupling nut, said thread being an inner thread of said nut, and the nut being rotatable about the central axis and restricted in movement relative to the main body in a direction that is substantially parallel to the central axis.

6. The system according to claim 5, having a plurality of alternative coupling nuts, each presenting a different inner thread.

7. The system according to claim 5, having a retention ring for retaining the nut axially relative to the main body.

8. A method of assembling a modular coupling from a system comprising:

a main body;

a thread about a central axis with restricted freedom to move relative to said main body at least in a direction parallel to said central axis;

a plurality of alternative toothed parts suitable for being fastened to the main body and each presenting a different set of teeth with at least one front tooth projecting along an axis parallel to said central axis;

a clamping collar for fastening the modular coupling to a cable, wherein the clamping collar comprises a pivot member with a first end connected to the main body via a hinge engaging it to pivot relative to the main body, and a device for fastening a second end of the pivot member to the main body after the collar has been clamped; and a strip, made of a more flexible material than the pivot member, the strip being secured to an inner surface of the pivot member over a length, so as to be radially interposed between the cable and the inner surface of the pivot member after the collar has been clamped, and presenting, between this length and an end of the strip, at least one mark corresponding to a predetermined clamping diameter, the at least one mark comprising a transverse notch formed in the strip, the method comprising steps of:

selecting, wherein, prior to being fastened to the main body, a toothed part is selected among the plurality of alternative toothed parts presenting different sets of front teeth so as to be complementary to a set of front teeth of another coupling to which the modular coupling is to be connected;

subsequently fastening the toothed part to the main body; and cutting the strip at the at least one mark corresponding to the predetermined clamping diameter.

9. The method of assembling a modular coupling according to claim 8, further including a step of selecting a coupling nut from a plurality of alternative nuts presenting different inner threads, so as to present an inner thread that is complementary to an outer thread of the other coupling, and a step of mounting the selected nut on the main body.

* * * * *